(12) United States Patent
Cho

(10) Patent No.: US 10,650,975 B2
(45) Date of Patent: May 12, 2020

(54) MULTILAYER ELECTRONIC COMPONENT

(71) Applicant: SAMSUNG ELECTRO-MECHANICS CO., LTD., Suwon-si, Gyeonggi-do (KR)

(72) Inventor: Beom Joon Cho, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 57 days.

(21) Appl. No.: 15/988,817

(22) Filed: May 24, 2018

(65) Prior Publication Data

US 2019/0164695 A1 May 30, 2019

(30) Foreign Application Priority Data

Nov. 24, 2017 (KR) .......................... 10-2017-0158388

(51) Int. Cl.
*H01G 4/005* (2006.01)
*H01G 4/228* (2006.01)
(Continued)

(52) U.S. Cl.
CPC .............. *H01G 4/30* (2013.01); *H01G 4/005* (2013.01); *H01G 4/008* (2013.01);
(Continued)

(58) Field of Classification Search
CPC .......... H01G 4/30; H01G 4/228; H01G 4/008; H01G 4/1227
See application file for complete search history.

(56) References Cited

U.S. PATENT DOCUMENTS

| 6,903,920 B1 | 6/2005 | Prymak |
| 10,056,193 B1 * | 8/2018 | Son .......................... H01G 4/30 |

(Continued)

FOREIGN PATENT DOCUMENTS

| JP | H11-219847 A | 8/1999 |
| KR | 10-2016-0016492 A | 2/2016 |

(Continued)

OTHER PUBLICATIONS

Korean Office Action dated Jan. 9, 2019 issued in Korean Patent Application No. 10-2017-0158388 (with English translation).

*Primary Examiner* — Nathan Milakovich
(74) *Attorney, Agent, or Firm* — Morgan, Lewis & Bockius LLP

(57) ABSTRACT

A multilayer electronic component includes: a first frame terminal including a first side frame, a first bottom frame and a first top frame; a second frame terminal including a second side frame, a second bottom frame and a second top frame; an electronic component including first and second external electrodes, and disposed between the first and second side frames; a first conductive adhesive disposed between the first external electrode and an upper portion of the first frame terminal; and a second conductive adhesive disposed between the second external electrode and an upper portion of the second frame terminal, wherein space portions are provided between the first and second external electrodes and lower portions of the first and second side frames and between the first and second external electrodes and the first and second bottom frames, respectively.

9 Claims, 8 Drawing Sheets

(51) Int. Cl.
    *H01G 4/30*     (2006.01)
    *H01G 4/12*     (2006.01)
    *H01G 4/008*     (2006.01)
    *H01G 4/232*     (2006.01)

(52) U.S. Cl.
    CPC .......... *H01G 4/1227* (2013.01); *H01G 4/228* (2013.01); *H01G 4/232* (2013.01)

(56) References Cited

U.S. PATENT DOCUMENTS

| | | | |
|---|---|---|---|
| 10,398,030 B2 * | 8/2019 | Park | |
| 10,403,433 B2 * | 9/2019 | Choi | H01G 4/30 |
| 10,460,874 B2 * | 10/2019 | Shimura | H01G 4/232 |
| 2008/0239621 A1 * | 10/2008 | Tajuddin | H01G 2/06 |
| | | | 361/306.1 |
| 2016/0042869 A1 | 2/2016 | Park et al. | |
| 2016/0205769 A1 * | 7/2016 | Park | H01G 4/224 |
| | | | 174/260 |
| 2016/0219739 A1 | 7/2016 | Park et al. | |
| 2017/0164479 A1 | 6/2017 | Park et al. | |
| 2019/0103221 A1 * | 4/2019 | Park | H01G 4/12 |
| 2019/0122823 A1 * | 4/2019 | Cho | H01G 4/30 |

FOREIGN PATENT DOCUMENTS

| | | |
|---|---|---|
| KR | 10-2016-0092251 A | 8/2016 |
| KR | 10-2017-0067493 A | 6/2017 |

\* cited by examiner

MULTILAYER ELECTRONIC COMPONENT

CROSS-REFERENCE TO RELATED APPLICATION(S)

This application is based on and claims the benefit of priority to Korean Patent Application No. 10-2017-0158388 filed on Nov. 24, 2017 in the Korean Intellectual Property Office, the disclosure of which is incorporated herein by reference in its entirety.

TECHNICAL FIELD

The present disclosure relates to a multilayer electronic component.

BACKGROUND

A multilayer electronic component may have a small size and high capacitance, to allow such a multilayer electronic component to be used in various electronic devices.

Recently, due to rapid rise in usage of eco-friendly vehicles and electric vehicles, a power driving systems in vehicles have increased, such that demand for a multilayer electronic component such as a multilayer capacitor required in a vehicle has increased.

In order to be used as a component for a vehicle, since the multilayer electronic component should have a high level of thermal resistance or electrical reliability, required performance of the multilayer electronic component has been gradually upgraded.

Therefore, demand for a multilayer electronic component capable of implementing high capacitance in a limited space or having excellent durability against vibrations or deformation has increased.

In a multilayer capacitor according to the related art, at the time of mounting the multilayer capacitor on a board, since a ceramic body and the board may come into directly contact with each other by a solder, heat or mechanical deformation generated in the circuit board may be directly transferred to the capacitor, such that it may be difficult to secure a high level of reliability.

Therefore, recently, a method of preventing stress from a board from being directly transferred to a multilayer capacitor by adhering a metal frame to a side surface of the multilayer capacitor to secure an interval between the multilayer capacitor and the board has been suggested.

Here, in order to increase resistance against warpage cracks of the multilayer capacitor to which the metal frame is adhered, there is a need to secure sufficient length in a portion of the metal frame that is not adhered to the multilayer capacitor. However, in the multilayer capacitor according to the related art, in order to secure the length of the metal frame, there is no alternative but to increase a length of the frame itself. In this case, a height of a component may be increased.

Further, delamination may occur in each interface due to a difference in coefficients of thermal expansion between adhesives used to adhere plating layers of external electrodes of the multilayer capacitor and the metal frame to each other and adhere the plating layers and the metal frame to each other at the time of surface-adhesion between the multilayer capacitor and the metal frame.

SUMMARY

An aspect of the present disclosure may provide a multilayer electronic component capable of decreasing a height of an overall component while having high resistance to thermal stress and mechanical stress as well as high reliability.

According to an aspect of the present disclosure, a multilayer electronic component may include: a first frame terminal including a first side frame extending in a first direction, a first bottom frame extending in a second direction and from a lower end of the first side frame, and a first top frame extending in the second direction and from an upper end of the first side frame; a second frame terminal including a second side frame facing the first side frame and extending in the first direction, a second bottom frame extending in a third direction opposite to the second direction and from a lower end of the second side frame, and a second top frame extending in the third direction and from an upper end of the second side frame; an electronic component including a first external electrode and a second external electrode disposed on opposing ends of the electronic component, respectively, and disposed between the first and second side frames; a first conductive adhesive disposed between the first external electrode and an upper portion of the first side frame and between the first external electrode and the first top frame; and a second conductive adhesive disposed between the second external electrode and an upper portion of the second side frame and between the second external electrode and the second top frame, wherein space portions are provided between the first and second external electrodes and lower portions of the first and second side frames and between the first and second external electrodes and the first and second bottom frames, respectively.

The electronic component may include a body including a plurality of dielectric layers and a plurality of first and second internal electrodes alternately disposed with respective dielectric layers interposed therebetween, and having first and second surfaces opposing each other and third and fourth surfaces connected to the first and second surfaces and opposing each other, one ends of the first and second internal electrodes being exposed to the third and fourth surfaces of the body, respectively, and the first and second external electrodes may respectively include first and second connection portions disposed on the third and fourth surfaces of the body, respectively, and connected to the first and second internal electrodes, respectively, and first and second band portions extending from the first and second connection portions to portions of the first and second surfaces of the body, respectively.

The multilayer electronic component may further include a sealing part enclosing the electronic component, wherein the sealing part is spaced apart from the first and second side frames and the first and second bottom frames.

The multilayer electronic component may further include a sealing part disposed to cover the electronic component and portions of the first and second top frames.

Portions of the first and second conductive adhesives may be not covered by the sealing part and exposed externally.

A connection angle between the first side frame and the first top frame and a connection angle between the second side frame and the second top frame may be substantially 90 degrees.

A connection angle between the first side frame and the first top frame and a connection angle between the second side frame and the second top frame may be smaller than 90 degrees.

According to another aspect of the present disclosure, a multilayer electronic component may include: a first frame terminal including a first side frame extending in a first direction, a first bottom frame extending in a second direction and from a lower end of the first side frame, and a first top frame extending in the second direction and from an upper end of the first side frame; a second frame terminal including a second side frame facing the first side frame and extending in the first direction, a second bottom frame extending in a third direction opposite to the second direction and from a lower end of the second side frame, and a second top frame extending in the third direction and from an upper end of the second side frame; an electronic component including a first external electrode and a second external electrode disposed on opposing ends of the electronic component, and disposed between the first and second side frames; first and second conductive adhesives respectively disposed between the first top frame and the first external electrode and between the second top frame and the second external electrode; and a sealing part disposed to cover the electronic component and portions of the first and second top frames, wherein space portions are provided between the sealing part and the first and second side frames and between the sealing part and the first and second bottom frames.

The electronic component may include a body including a plurality of dielectric layers and a plurality of first and second internal electrodes alternately disposed with respective dielectric layers interposed therebetween, and having first and second surfaces opposing each other and third and fourth surfaces connected to the first and second surfaces and opposing each other, one ends of the first and second internal electrodes being exposed to the third and fourth surfaces of the body, respectively, and the first and second external electrodes may respectively include first and second connection portions disposed on the third and fourth surfaces of the body, respectively, and connected to the first and second internal electrodes, respectively, and first and second band portions extending from the first and second connection portions to portions of the first and second surfaces of the body, respectively.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will be described in detail with reference to the accompanying drawings.

Figure 1:
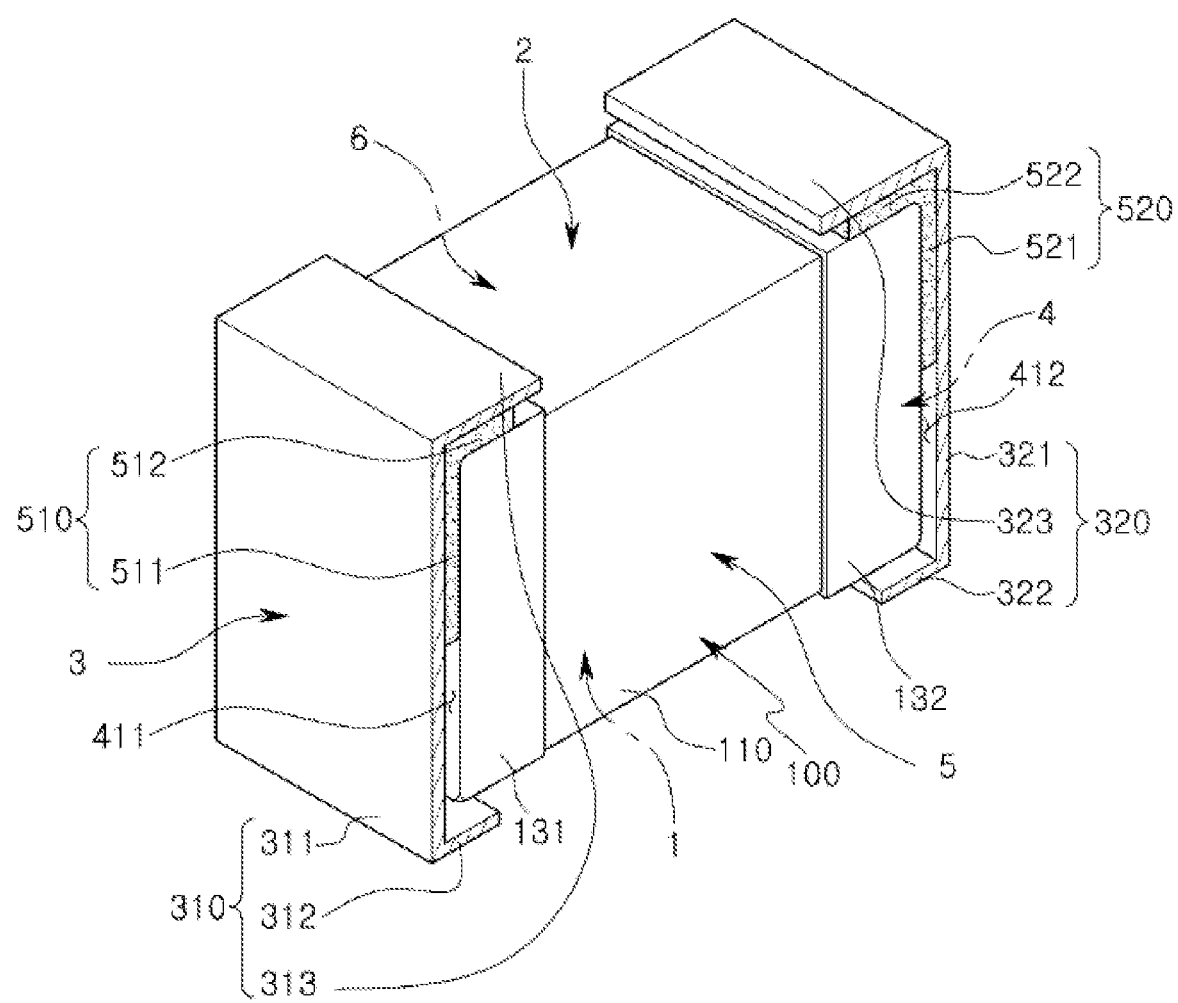
FIG. 1 is a perspective view schematically illustrating a multilayer electronic component according to an exemplary embodiment in the present disclosure.
Figure 2:
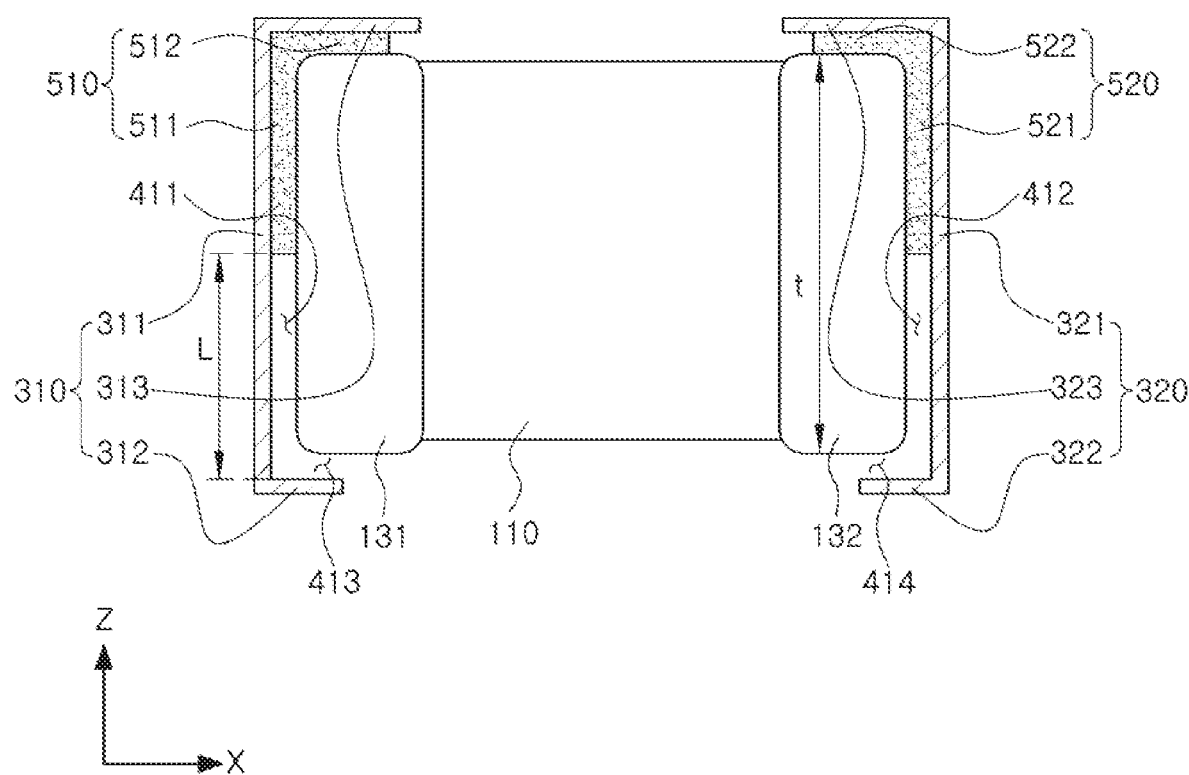
FIG. 2 is a front view of the multilayer electronic component of FIG. 1.
Figure 3:
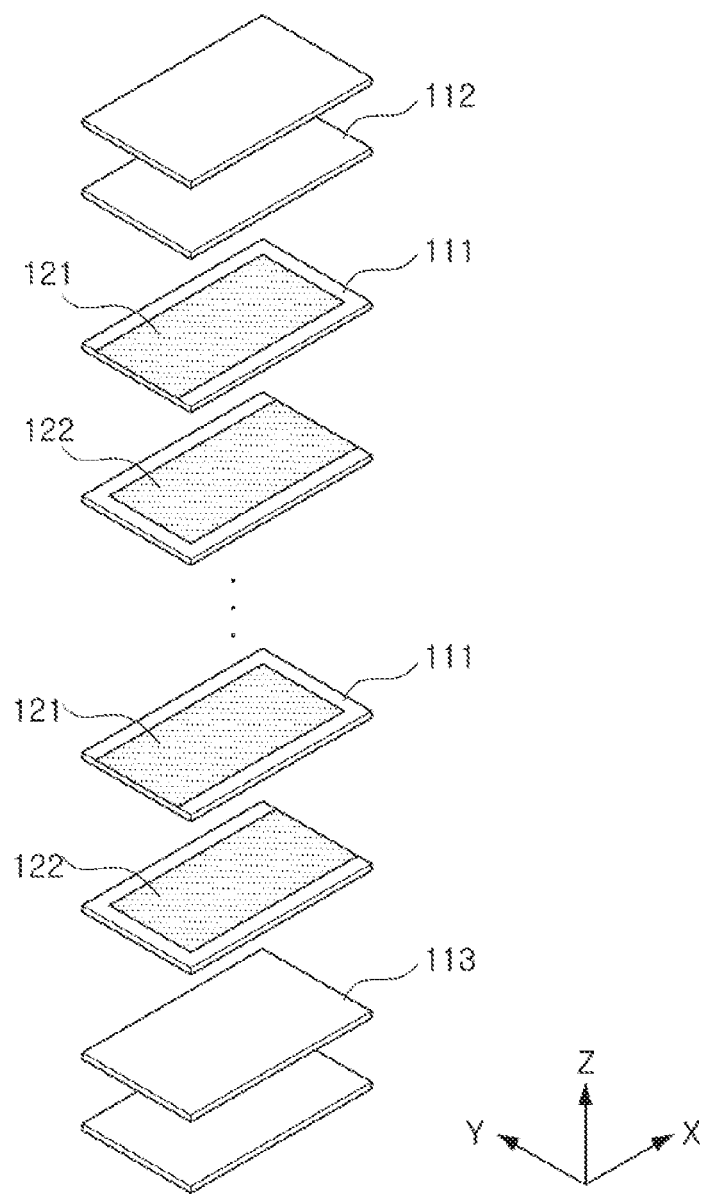
FIG. 3 is an exploded perspective view illustrating a stacking structure of internal electrodes in the multilayer electronic component according to the exemplary embodiment in the present disclosure.

FIG. 1 is a perspective view schematically illustrating a multilayer electronic component according to an exemplary embodiment in the present disclosure, FIG. 2 is a front view of the multilayer electronic component FIG. 1, and FIG. 3 is an exploded perspective view illustrating a stacking structure of internal electrodes in the multilayer electronic component according to the exemplary embodiment in the present disclosure.

Directions of a body 110 will be defined in order to clearly describe exemplary embodiments in the present disclosure. X, Y, and Z illustrated in the accompanying drawings refer to a length direction, a width direction, and a thickness direction of the body 110, respectively. Here, the thickness direction may be the same as a stacking direction in which dielectric layers 111 are stacked.

Referring to FIGS. 1 through 3, the multilayer electronic component according to the exemplary embodiment in the present disclosure may include an electronic component 100; first and second frame terminals 310 and 320; and first and second conductive adhesives 510 and 520.

The first frame terminal 310 may include a first side frame 311 extending in a first direction, a first bottom frame 312 extending from a lower end of the first side frame 311 in a second direction, and a first top frame 313 extending from an upper end of the first side frame 311 in the second direction.

The second frame terminal 320 may include a second side frame 321 facing the first side frame 311 and extending in the first direction, a second bottom frame 322 extending from a lower end of the second side frame 321 in a third direction, and a second top frame 323 extending from an upper end of the second side frame 321 in the third direction.

Here, the first direction may refer to a direction perpendicular to a mounting surface, or the Z direction corresponding to the thickness direction of the electronic component 100.

Further, the second direction may refer to a direction substantially perpendicular to the first direction, and the third direction may be defined as a direction substantially perpendicular to the first direction but opposite to the second direction.

Due to the above-mentioned structure, the first and second frame terminals 310 and 320 may substantially have '[' and ']' shapes, respectively, and be disposed so that end portions of the first and second frame terminals 310 and 320 face each other in the X direction, respectively.

Figure 9:
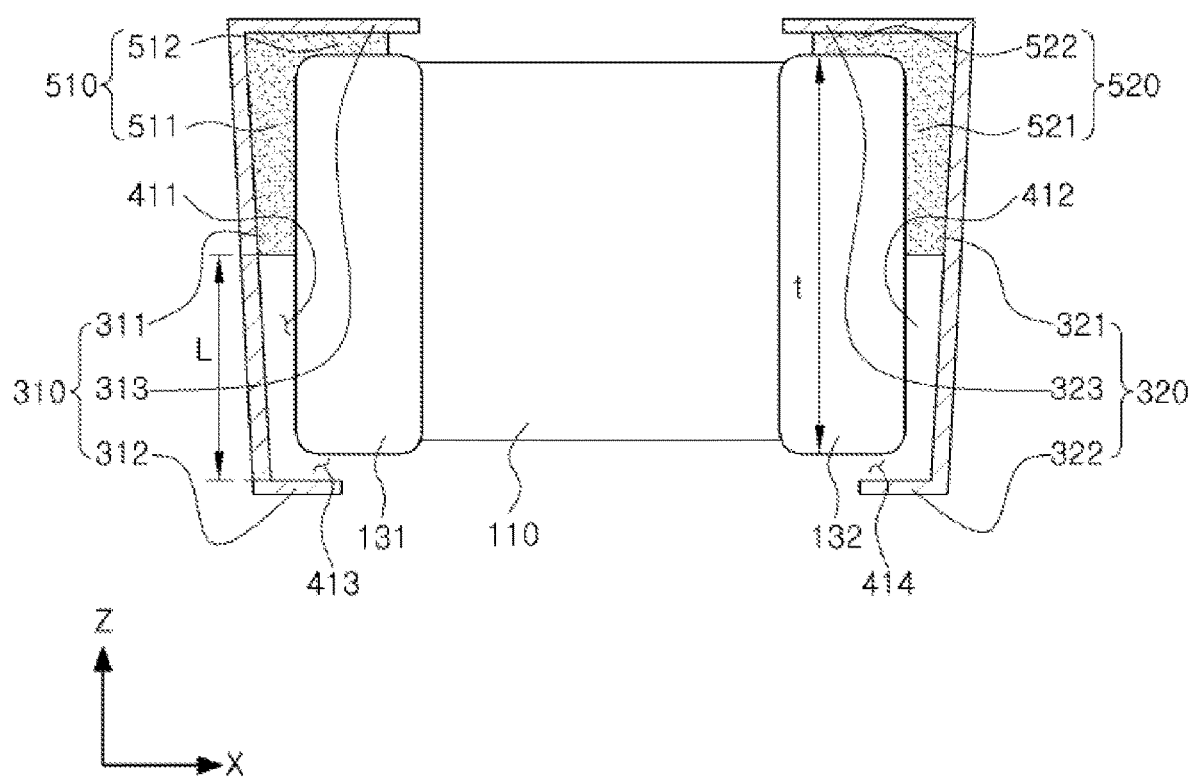
FIG. 9 is a front view of a multilayer electronic component according to another exemplary embodiment in the present disclosure.

In this case, a connection angle between the first side frame 311 and the first top frame 313 and a connection angle between the second side frame 321 and the second top frame 323 may be 90 degrees. If necessary, the connection angles may be narrower than 90 degrees, as shown in FIG. 9, such that the first and second bottom frames 312 and 322 may be disposed below first and second external electrodes 131 and 132, and thus, at the time of mounting the multilayer electronic component on a board, a land pattern is not changed but may be used as it is.

The electronic component 100 may be disposed between the first and second side frames 311 and 321.

Further, the electronic component 100 may include the body 110 and the first and second external electrodes 131 and 132 disposed on both ends of the body 110 opposing each other in the X direction. The electronic component 100 according to the present exemplary embodiment may be a multilayer capacitor.

The body 110 of the electronic component 100 may be formed by stacking a plurality of dielectric layers 111 in the Z direction and then sintering the stacked dielectric layers 111 and include the plurality of dielectric layers 111 and a plurality of first and second internal electrodes 121 and 122 alternately disposed in the Z direction with respective dielectric layers 111 interposed therebetween.

In addition, if necessary, covers 112 and 113 having a predetermined thickness may be formed in both portions of the body 110 in the Z direction.

In this case, the respective adjacent dielectric layers 111 of the body 110 may be integrated with each other so that boundaries therebetween are not readily apparent.

The body 110 as described above may generally have a hexahedral shape. However, a shape of the body 110 is not limited thereto.

In the present exemplary embodiment, for convenience of explanation, both surfaces of the body 110 opposing each other in the Z direction will be defined as first and second surfaces 1 and 2, both surfaces of the body 110 connected to the first and second surfaces 1 and 2 and opposing each other in the X direction will be defined as third and fourth surfaces 3 and 4, and both surfaces of the body 110 connected to the first and second surfaces 1 and 2 and the third and fourth surfaces 3 and 4 and opposing each other in the Y direction will be defined as fifth and sixth surfaces 5 and 6. In the present exemplary embodiment, the first surface 1 corresponding to a lower surface may become a surface in a mounting direction.

In addition, the dielectric layer 111 may contain a ceramic material having high permittivity, for example, a $BaTiO_3$ based ceramic powder, or the like. However, a material of the dielectric layer 111 is not limited thereto.

The $BaTiO_3$ based ceramic powder may be, for example, $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$ in which Ca, Zr, are the like, are partially solid-dissolved in $BaTiO_3$, or the like, but the $BaTiO_3$-based ceramic powder is not limited thereto.

Further, a ceramic additive, an organic solvent, a plasticizer, a binder, a dispersant, and the like, may be further added to the dielectric layer 111 together with the ceramic powder. As the ceramic additive, for example, a transition metal oxide or carbide, rare earth elements, magnesium (Mg), aluminum (Al), or the like, may be used.

The first and second internal electrodes 121 and 122, which are electrodes having different polarities from each other, may be alternately disposed to face each other in the Z direction with respective dielectric layers 111 interposed therebetween, and one ends of the first and second internal electrodes 121 and 122 may be exposed to the third and fourth surfaces of the body 110, respectively.

In this case, the first and second internal electrodes 121 and 122 may be electrically insulated from each other by the dielectric layer 111 disposed therebetween.

In addition, end portions of the first and second internal electrodes 121 and 122 alternately exposed to the third and fourth surfaces 3 and 4 of the body 110 may be electrically connected to the first and second external electrodes 131 and 132, respectively.

In this case, the first and second internal electrodes 121 and 122 may be formed of a conductive metal, for example, nickel (Ni), a nickel (Ni) alloy, or the like. However, a material of the first and second internal electrodes 121 and 122 is not limited thereto.

Due to the above-mentioned configuration, when a predetermined voltage is applied to the first and second external electrodes 131 and 132, electric charges may be accumulated between the first and second internal electrodes 121 and 122 facing each other.

In this case, capacitance of the electronic component 100 may be in proportion to an overlapping area between the first and second internal electrodes 121 and 122 overlapping each other in the Z direction.

Voltages having different polarities may be provided to the first and second external electrodes 131 and 132, and the first and second external electrodes 131 and 132 may be electrically connected to exposed portions of the first and second internal electrodes 121 and 122, respectively.

The first and second external electrodes 131 and 132 may respectively include first and second connection portions disposed on the third and fourth surfaces 3 and 4 of the body 110 to thereby be connected to the first and second internal electrodes 121 and 122, respectively, and first and second band portions extending from the first and second connection portions to portions of the first and second surfaces 1 and 2 of the body 110, respectively.

In addition, if necessary, plating layers may be formed on surfaces of the first and second external electrodes 131 and 132.

For example, the first and second external electrodes 131 and 132 may include first and second conductive layers, first and second nickel (Ni) plating layers formed on the first and second conductive layers, and first and second tin (Sn) plating layers formed on the first and second nickel (Ni) plating layers, respectively.

The first and second external electrodes 131 and 132 of the electronic component 100 may be electrically connected to the first and second frame terminals 310 and 320, respectively.

Here, portions of the first and second band portions of the first and second external electrodes 131 and 132 of the electronic component 100 disposed on the second surface of the body 110 corresponding to an upper surface of the body 110 may come in contact with the first and second top frames 313 and 323 to thereby be electrically connected thereto, respectively.

To this end, the multilayer electronic component according to the present exemplary embodiment may include the first and second conductive adhesives 510 and 520.

The first and second conductive adhesives 510 and 520 may contain a high-temperature solder, a conductive resin paste, or the like, but a material of the first and second conductive adhesives 510 and 520 is not limited thereto.

The first conductive adhesive 510 may include a portion formed between an upper portion of the first side frame 311 and an upper portion of the first connection portion of the first external electrode 131 and a portion formed between the first top frame 313 and the first band portion in an upper portion of the first external electrode 131.

Further, the second conductive adhesive 520 may include a portion formed between an upper portion of the second side frame 321 and an upper portion of the second connection portion of the second external electrode 132 and a portion formed between the second top frame 323 and the second band portion in an upper portion of the second external electrode 132.

Therefore, space portions 411 and 413 may be provided between a lower portion of the first side frame 311 on which the first conductive adhesive 510 is not formed and a lower portion of the first connection portion of the first external electrode 131 and between the first bottom frame 312 and the first band portion in a lower portion of the first external electrode 131.

Further, space portions 412 and 414 may be provided between a lower portion of the second side frame 321 on which the second conductive adhesive 520 is not formed and a lower portion of the second connection portion of the second external electrode 132 and between the second bottom frame 322 and the second band portion in a lower portion of the second external electrode 132.

The space portions 413 and 414 provided in the Z direction may prevent deformation stress, or the like, of a board from being directly transferred to the electronic component 100 at the time of mounting the multilayer electronic component on the board, such that reliability of the multilayer electronic component may be improved.

Here, since the space portions 413 and 414 are provided to be close to the mounting surface in the Z direction based on the electronic component 100, the first and second frame terminals 310 and 320 may act like a spring, such that an effect of absorbing external stress such as deformation stress of the board, or the like, may be more effectively exhibited.

Further, the space portions 411 and 412 provided in the X direction may allow the electronic component 100 and the first and second frame terminals 310 and 320 to move individually, such that the first and second frame terminals 310 and 320 may more efficiently absorb external stress such as deformation stress of the board, or the like.

Figure 4:
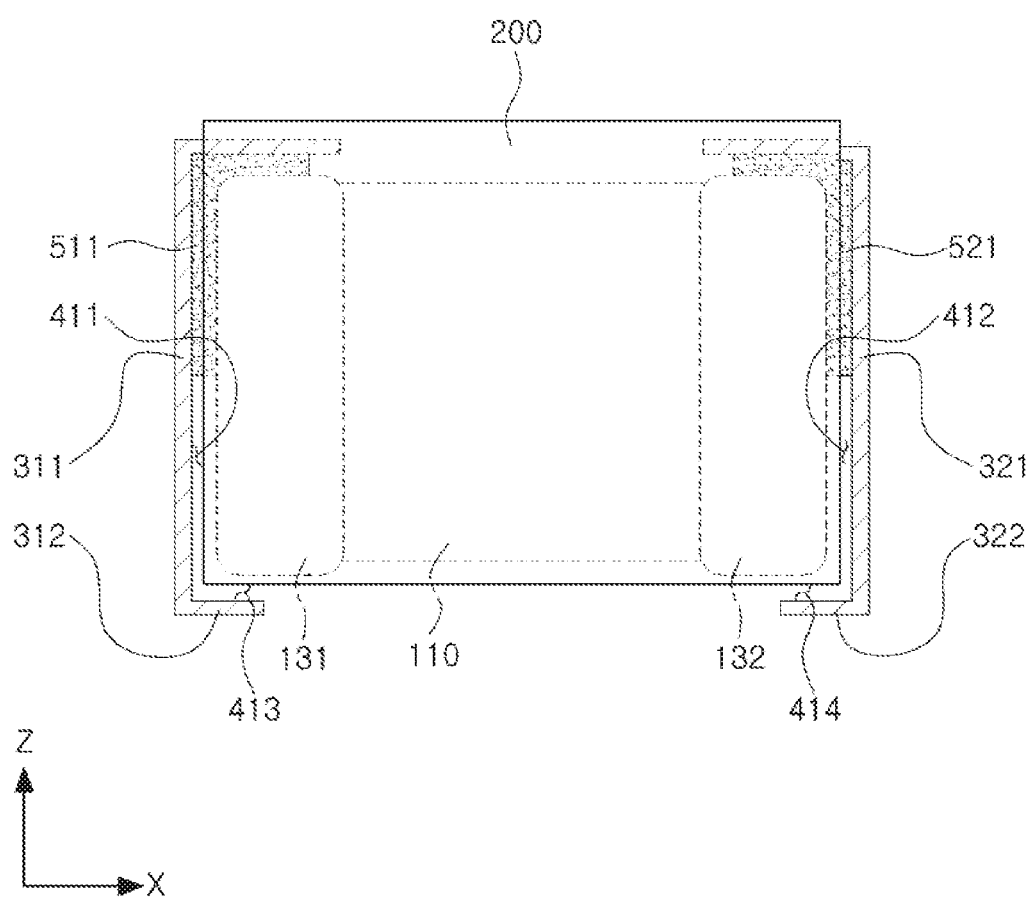
FIG. 4 is a front view schematically illustrating a state in which a sealing part is formed in the multilayer electronic component of FIG. 1.

Referring to FIG. 4, the multilayer electronic component according to the present exemplary embodiment may further include a sealing part 200.

The sealing part 200 may be formed of an insulator such as an insulating resin and formed to enclose the electronic component 100.

That is, the sealing part 200 may be formed to cover the electronic component 100 and portions of the first and second top frames 313 and 323. Therefore, the sealing part 200 may protect the electronic component 100 from external impact and moisture while maintaining a state of adhesion between the electronic component 100 and the first and second frame terminals 310 and 320, such that reliability of the electronic component 100 may be improved.

Here, intervals between the sealing part 200 and the lower portions of the first and second side frames 311 and 321 and between the sealing part 200 and the first and second bottom frames 312 and 322 may be maintained by exposing the first and second side frames 311 and 321 and the first and second bottom frames 312 and 322 to the outside.

Therefore, freedom in deformation of the first and second frame terminals 310 and 320 due to external deformation may be maintained.

Further, a portion 511 of the first conductive adhesive and a portion 521 of the second conductive adhesive are not covered by the sealing part 200 but may be exposed externally.

Therefore, according to the present exemplary embodiment, non-adhered portions may be artificially formed between both surfaces of the electronic component 100 in the length direction and the first and second frame terminals 310 and 320, such that elastic deformation of the first and second frame terminals 310 and 320 may more freely occur, and an interface between the first frame terminal and the first external electrode and an interface between the second frame terminal and the second external electrode may be significantly decreased, thereby further decreasing stress such as thermal stress caused by a difference in coefficient of thermal expansion and mechanical stress. Further, an entire height of the multilayer electronic component may be decreased by decreasing an entire length of the first and second frame terminals 310 and 320.

Figure 5:
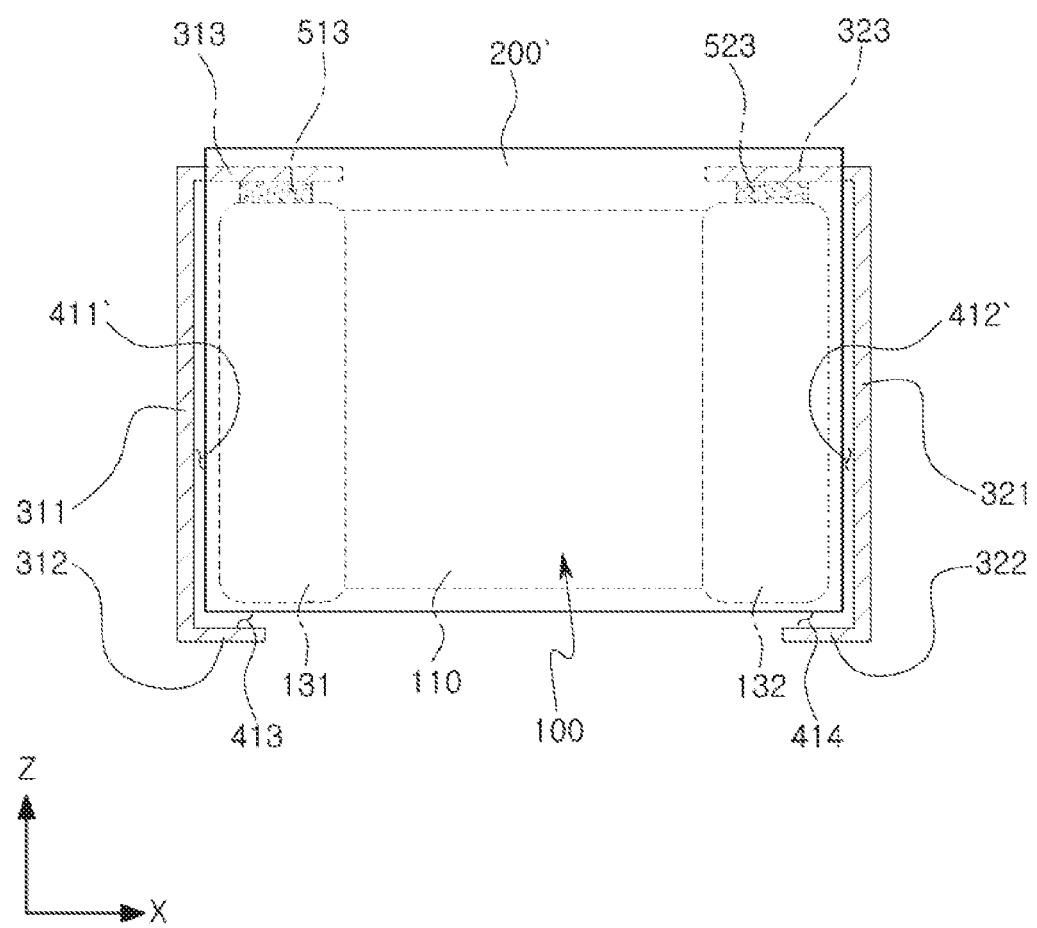
FIG. 5 is a front view schematically illustrating a multilayer electronic component according to another exemplary embodiment in the present disclosure.

FIG. 5 is a front view schematically illustrating a multilayer electronic component according to another exemplary embodiment in the present disclosure.

Here, since structures of first and second frame terminals, a body, and first and second external electrodes are similar to those in the above-mentioned exemplary embodiment, a detailed description thereof will be omitted in order to avoid overlapping descriptions, and first and second conductive adhesives and a sealing parts having different structures from those in the above-mentioned exemplary embodiment will be illustrated in FIG. 5, and described in more detail with reference to FIG. 5.

First and second conductive adhesives 513 and 523 may be disposed between first and second top frames 313 and 323 and first and upper portions of second band portions of first and second external electrodes 131 and 132, respectively, and are not disposed between first and second side frames 311 and 321 and first and second connection portions of the first and second external electrodes 131 and 132.

In addition, a sealing part 200' may be formed to enclose an electronic component 100. Therefore, space portions 411' and 412' may be provided between the sealing part 200' and the first and second side frames 311 and 321, respectively, and space portions may be provided between the sealing part 200' and first and second bottom frames 312 and 322, respectively.

In order to evaluate bending strength depending on a length of the frame terminals 310 and 320 that do not come into contact with the electronic component 100, after the multilayer electronic component to which the frame terminals are adhered is mounted on a board such as a printed circuit board (PCB), or the like, at the time of applying a pressure at a predetermined rate onto the board to bend the board downwardly in a state in which a surface of the board on which the multilayer electronic component is mounted faces down and both sides of the board are put on a support, a degree of bending may be measured.

In this case, a change in capacitance of the multilayer electronic component may be checked together. The reason is that when cracks or delamination occurs in the electronic component due to deformation of the board, capacitance may be changed. Then, results obtained by measuring the degrees of bending are illustrated in FIGS. 6 through 8.

Figure 6:
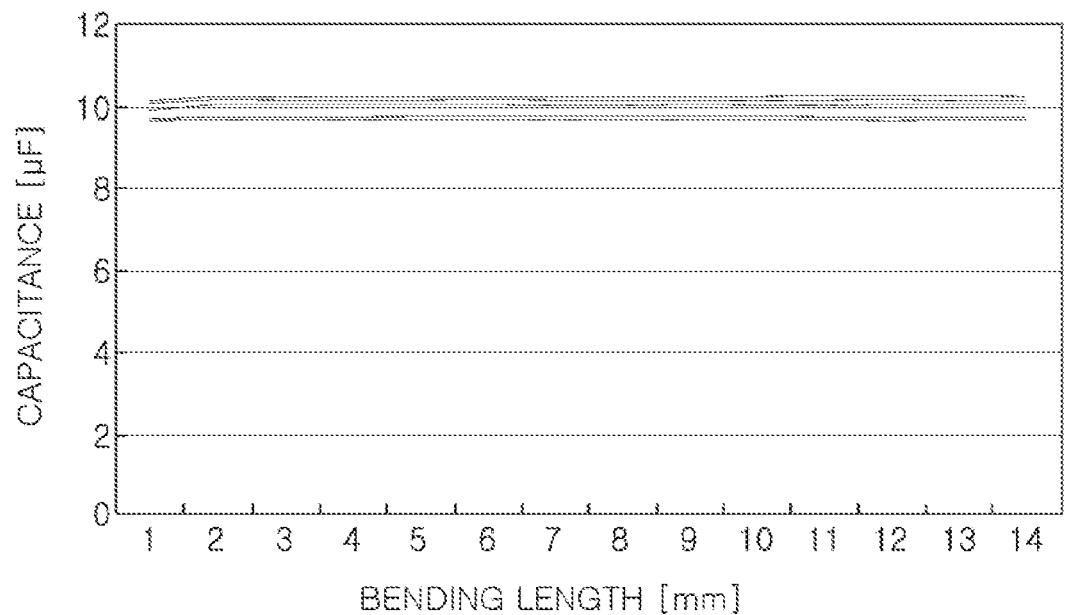
FIGS. 6 through 8 are graphs illustrating bending strength of multilayer electronic components depending on a binding length of a side frame of a frame terminal.
Figure 7:
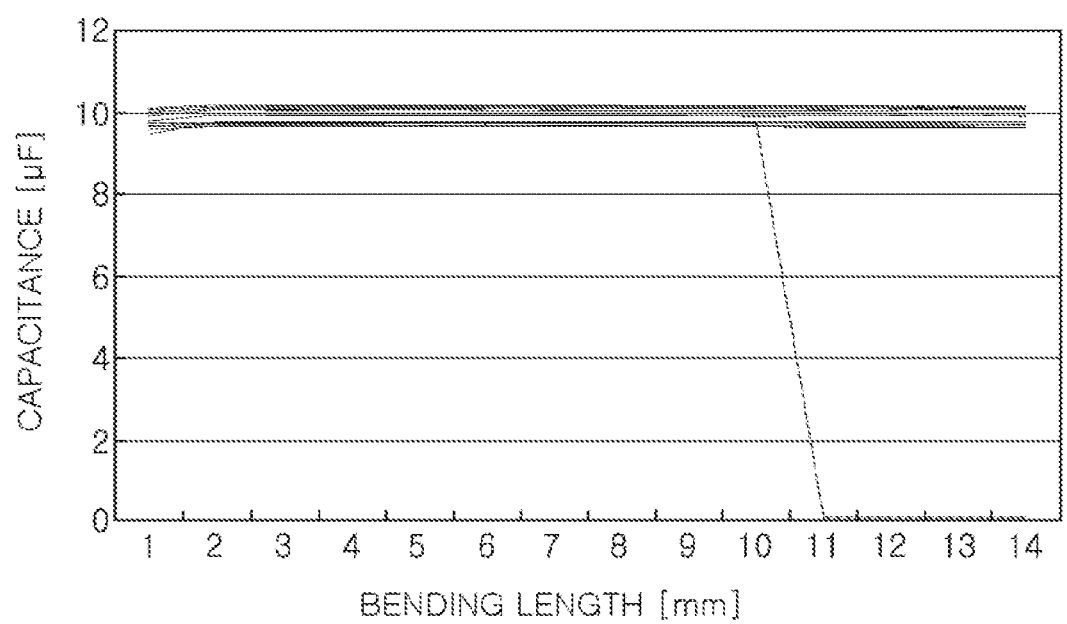
Figure 8:
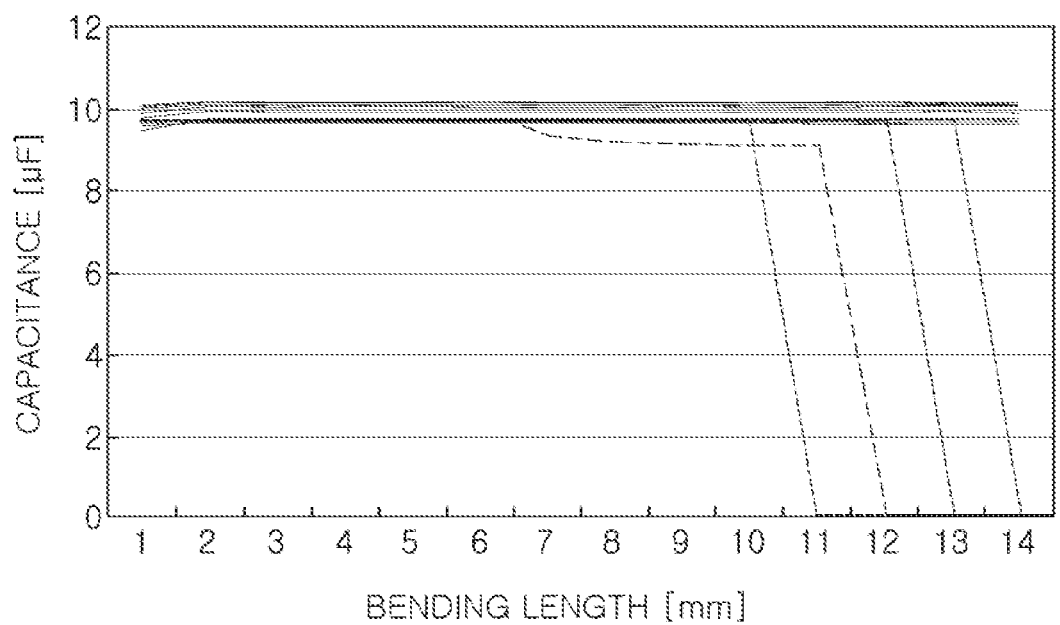

When a thickness of the first and second external electrodes is defined as t, and a height of portions of the first and second side frames spaced apart from the first and second external electrodes, respectively, is defined as L, FIG. 6, FIG. 7, and FIG. 8 are graphs illustrating the results when L≥t, L≤t/2, and L=0, respectively.

Referring to FIGS. 6 through 8, it may be appreciated that as a length L of unbound portions of the frame terminals, that is, a length of portions of the side frames that do not come in contact with the electronic component is increased, occurrence of defects caused by deformation of the board may be decreased.

Therefore, when side frames are adhered to entire connection portions of external electrodes of an electronic component as in the related art, there is a need to secure a length of frame terminals extending from a lower portion of the electronic component in order to strengthen the bending strength, and as a result, a height of a component may be increased.

However, according to the present exemplary embodiment, the band portions in the upper portions of the external electrodes and the top frames of the frame terminals may be adhered, and non-adhered regions may be formed between the lower portions of the side frames and the lower portions of the connection portions of the external electrodes, such that the length of unbound portions of the frame terminals may be sufficiently secured. Therefore, an additional increase in height in addition to the height of the electronic component is not much required.

As set forth above, according to exemplary embodiments in the present disclosure, stress such as thermal stress caused by a difference in coefficient of thermal expansion and mechanical stress may be more effectively decreased by significantly decreasing interfaces between the frame terminal and the external electrodes while securing the space portions between the frame terminals and the external electrodes so that elastic deformation of the frame terminals may more freely occur, such that the height of the overall component may be decreased, and durability and reliability of the multilayer electronic component may be improved.

While exemplary embodiments have been shown and described above, it will be apparent to those skilled in the art that modifications and variations could be made without departing from the scope of the present invention as defined by the appended claims.

What is claimed is:

1. A multilayer electronic component comprising:
    a first frame terminal including a first side frame extending in a first direction, a first bottom frame extending in a second direction and from a lower end of the first side frame, and a first top frame extending in the second direction and from an upper end of the first side frame;
    a second frame terminal including a second side frame facing the first side frame and extending in the first direction, a second bottom frame extending in a third direction opposite to the second direction and from a lower end of the second side frame, and a second top frame extending in the third direction and from an upper end of the second side frame;
    an electronic component including a first external electrode and a second external electrode disposed on opposing ends of the electronic component, respectively, and disposed between the first and second side frames;
    a first conductive adhesive disposed between the first external electrode and an upper portion of the first side frame and between the first external electrode and the first top frame;
    a second conductive adhesive disposed between the second external electrode and an upper portion of the second side frame and between the second external electrode and the second top frame; and
    a sealing part entirely enclosing the electronic component,
    wherein space portions are provided between the first and second external electrodes and lower portions of the first and second side frames and between the first and second external electrodes and the first and second bottom frames, respectively, and
    wherein a portion of the first conductive adhesive is arranged between the first side frame and a first side surface of the sealing part adjacent to the first side frame, so as to be exposed externally, and
    wherein a portion of the second conductive adhesive is arranged between the second side frame and a second side surface of the sealing part adjacent to the second side frame, so as to be exposed externally.

2. The multilayer electronic component of claim 1, wherein the electronic component includes a body including a plurality of dielectric layers and a plurality of first and second internal electrodes alternately disposed with a respective dielectric layer of the plurality of dielectric layers interposed therebetween, and having first and second surfaces opposing each other and third and fourth surfaces connected to the first and second surfaces and opposing each other, one end of the plurality of first and second internal electrodes being exposed to the third and fourth surfaces of the body, respectively, and
    the first and second external electrodes respectively include first and second connection portions disposed on the third and fourth surfaces of the body, respectively, and connected to the plurality of first and second internal electrodes, respectively, and first and second band portions extending from the first and second connection portions to portions of the first and second surfaces of the body, respectively.

3. The multilayer electronic component of claim 1, wherein the sealing part is spaced apart from the first and second side frames and the first and second bottom frames.

4. The multilayer electronic component of claim 1, wherein the sealing part is disposed to cover the electronic component and portions of the first and second top frames.

5. The multilayer electronic component of claim 4, wherein portions of the first and second conductive adhesives are not covered by the sealing part and are exposed externally.

6. The multilayer electronic component of claim 1, wherein a connection angle between the first side frame and the first top frame and a connection angle between the second side frame and the second top frame are each substantially 90 degrees.

7. The multilayer electronic component of claim 1, wherein a connection angle between the first side frame and the first top frame and a connection angle between the second side frame and the second top frame are each less than 90 degrees.

8. A multilayer electronic component comprising:
    a first frame terminal including a first side frame extending in a first direction, a first bottom frame extending in a second direction and from a lower end of the first side frame, and a first top frame extending in the second direction and from an upper end of the first side frame;
    a second frame terminal including a second side frame facing the first side frame and extending in the first direction, a second bottom frame extending in a third direction opposite to the second direction and from a lower end of the second side frame, and a second top frame extending in the third direction and from an upper end of the second side frame;
    an electronic component including a first external electrode and a second external electrode disposed on opposing ends of the electronic component, and disposed between the first and second side frames;
    first and second conductive adhesives respectively disposed between the first top frame and the first external electrode and between the second top frame and the second external electrode; and
    a sealing part disposed to entirely enclose the electronic component and portions of the first and second top frames,
    wherein space portions are provided between the sealing part and the first and second side frames and between the sealing part and the first and second bottom frames,
    wherein a portion of the first conductive adhesive is arranged between the first side frame and a first side surface of the sealing part adjacent to the first side frame, so as to be exposed externally, and wherein a portion of the second conductive adhesive is arranged between the second side frame and a second side surface of the sealing part adjacent to the second side frame, so as to be exposed externally.

9. The multilayer electronic component of claim 8, wherein the electronic component includes a body including a plurality of dielectric layers and a plurality of first and second internal electrodes alternately disposed with a respective dielectric layer of the plurality of dielectric layers interposed therebetween, and having first and second surfaces opposing each other and third and fourth surfaces connected to the first and second surfaces and opposing each other, one end of the plurality of first and second internal electrodes being exposed to the third and fourth surfaces of the body, respectively, and the first and second external electrodes respectively include first and second connection portions disposed on the third and fourth surfaces of the body, respectively, and connected to the plurality of first and second internal electrodes, respectively, and first and second band portions extending from the first and second connection portions to portions of the first and second surfaces of the body, respectively.

* * * * *